United States Patent [19]
Richards

[11] B 3,913,869

[45] Oct. 21, 1975

[54] SLOW-SPEED TAPE RECORDER DRIVE MECHANISM

[75] Inventor: William D. Richards, Medway, Mass.

[73] Assignee: American Optical Corporation, Southbridge, Mass.

[22] Filed: Sept. 10, 1973

[21] Appl. No.: 396,025

[44] Published under the Trial Voluntary Protest Program on January 28, 1975 as document no. B 396,025.

[52] U.S. Cl. .................. 242/206; 242/200; 360/90
[51] Int. Cl.² ...................... G03B 1/04; G11B 15/32
[58] Field of Search ........................... 242/197–208; 360/90–93

[56] References Cited

UNITED STATES PATENTS 3,610,533 10/1971 Matsuyama ......................... 242/206
3,767,137 10/1973 Richt et al. ......................... 242/206

*Primary Examiner*—Leonard D. Christian
*Attorney, Agent, or Firm*—Joel Wall; William C. Nealon; H. R. Berkenstock, Jr.

[57] ABSTRACT

There is disclosed a slow-speed tape recorder drive mechanism. A slow-speed synchronous AC motor is spring-coupled to a pulley, which in turn drives a flywheel via a belt. A capstan pulley is driven via a second belt by the flywheel, and an intermediate pulley, driven via a third belt by the flywheel, is mounted for free rotation on the capstan pulley. This intermediate pulley drives a take-up pulley via a fourth belt. The surface speed of the capstan is less than one inch per second and at the operating speed the ratio of the inertia of the flywheel to the inertia of the capstan element is greater than 25:1.

8 Claims, 3 Drawing Figures

SLOW-SPEED TAPE RECORDER DRIVE MECHANISM

This invention relates to tape drive mechanisms, and more particularly to drive mechanisms for slow-speed tape recorders.

In many applications in which tape recorders are used, there is a need for precise speed control. But there is a particular class of applications in which such control is very difficult to achieve. In general, the larger the apparatus and/or the faster the tape speed, the easier it is to achieve a constant tape speed. The problems arise in connection with small, slow-speed recorders.

Consider, for example, a portable tape recorder used to record the physiological signals of a patient, such as a portable tape recorder for recording an ECG signal. In many instances it is desirable to record the continuous ECG signal for a 24-hour period on a single standard tape cassette. To do this, the tape must be moved at well below 1 inch per second, e.g., 1/16th inch per second. It is very important that the tape speed be constant; when the tape is reviewed, the time intervals between R waves of successive beats are often measured, and these time intervals can vary greatly if the tape speed was not held constant during recording. It is necessary to keep both high-frequency (flutter) and low-frequency (wow) variations to a minimum. This is exceedingly difficult to achieve in a miniature (portable), slow-speed tape recorder. (Although the illustrative embodiment of the invention described below is in the context of a tape recorder with no playback, or rewind, capability inasmuch as a recorded cassette is typically reviewed on a separate playback system, the principles of the invention are equally applicable to slow-speed tape recorders which are capable of moving a tape in both directions.)

As an initial step in achieving constant tape speed, a slow-speed synchronous motor may be used. But a typical motor of this type, for example, one with a permanent magnet rotor, exhibits "cogging;" the motor torque changes as the poles of the permanent magnet rotor pass the stator gaps, and thus the speed cannot be constant. To filter out these high-speed variations, as well as to provide the necessary speed reduction from the motor to the capstan drive, an elastic or yielding belt can be used. Typically, an inertia element (a flywheel) is driven by the belt, with the capstan being fixed along its axis. The drive belt couples the motor shaft to the flywheel for directly driving the capstan. This is the approach taken in standard tape recorders which run at normal tape speeds (e.g., 1⅞ inches per second). The flywheel stores energy and tends to rotate at a constant speed. The belt, which continuously supplies energy to the flywheel, is capable of stretching and then contracting as required to control a smooth filtered flow of energy from the motor to the flywheel, so that a constant capstan speed can be achieved.

But in a slow-speed recorder, if the capstan is secured to the flywheel, then the low-speed of the flywheel will not be sufficient to maintain a constant speed; the inertia of the flywheel will be too low. Furthermore, it is generally recognized that the greater the speed reduction, the greater the wow and flutter introduced by the reduction elements themselves. In a slow-speed recorder of the type described, the "noise" introduced by the speed reduction elements themselves may deleteriously affect the speed regulation to too great a degree.

In short, a slow capstan speed prevents the inertia element from reducing the wow and flutter sufficiently in a standard type drive mechanism. And if a high-speed (flutter-free) motor is used, the speed reduction must be so great that the speed reduction elements themselves introduce excessive variations in the tape speed.

It is a general object of my invention to provide a compact, highly regulated, slow-speed tape recorder drive mechanism which overcomes the aforesaid problems.

Briefly, in accordance with the principles of my invention and as disclosed in the illustrative embodiment thereof, I utilize a relatively slow-speed (below 400 rpm) synchronous AC motor which is coupled through a yielding belt reduction element to an inertia element (flywheel); the inertia element is coupled through another belt reduction to the capstan element. Because the inertia element is placed at a point between the motor drive and the capstan, it has enough speed to be an effective regulator even though the capstan moves at a slow speed. And the use of a relatively slow-speed motor minimizes the total speed reduction required so that the reduction elements themselves do not introduce excessive wow and flutter.

In the illustrative embodiment of the invention, the motor runs at 300 rpm, the flywheel is turned at 130 rpm, and the capstan rotates at 18 rpm. The ratio of the inertia of the flywheel to the inertia of the capstan element is proportional to the square of the speed ratio, and, consequently, without even considering the much greater mass of the flywheel relative to that of the capstan, the inertia of the flywheel is approximately 50 times as great as that of the capstan element. The ratio of the inertia values at the operating speed, of course, is much greater because of the much greater mass of the flywheel. In accordance with the principles of my invention, the surface speed of the capstan is under 1 inch per second, and at the operating speed of the recorder the ratio of the inertia of the flywheel to the inertia of the capstan element is greater than 25:1.

Further, in the preferred embodiment of the invention the take-up reel is driven through a separate reduction mechanism by the inertia element. A first belt couples the flywheel to an intermediate pulley, and a second belt couples the intermediate pulley to the take-up drive spindle. For the sake of compactness, the intermediate pulley is mounted on the same axis as the capstan. Although a single belt can be used to drive both the capstan and the take-up element by the flywheel, a separate drive for the cassette take-up reel is preferred so that the inertia of the flywheel can isolate load variations introduced by the take-up mechanism from the capstan.

Further objects, features and advantages of my invention will become apparent upon consideration of the following detailed description in conjunction with the drawings, in which.

Figure 1:
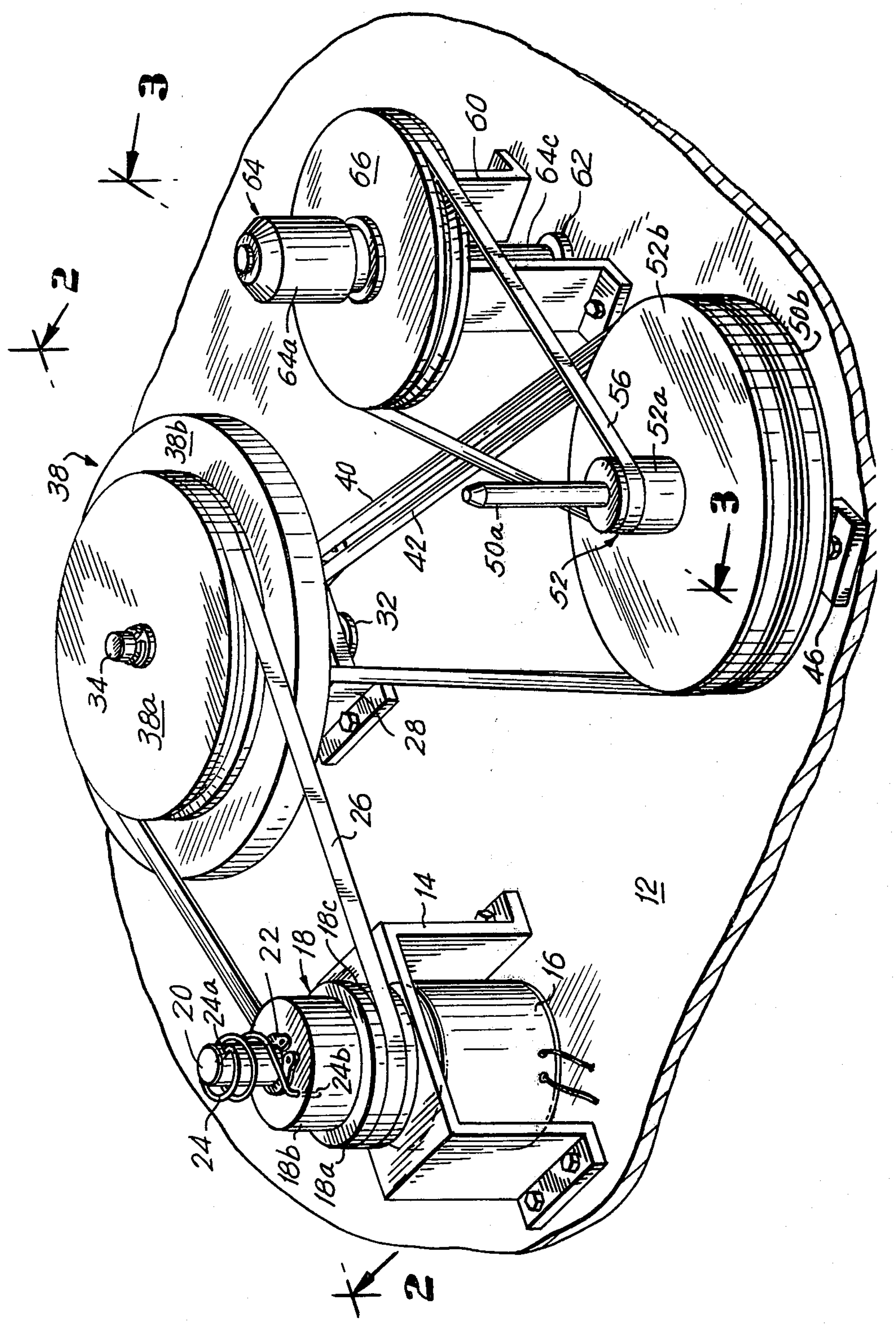
FIG. 1 is a perspective view which depicts schematically the illustrative embodiment of the invention.

The tape drive mechanism is shown mounted on a platform 12. Synchronous AC motor 16 is mounted (not shown) to the platform and a U-shaped bracket 14 is secured to the platform over the motor. A bearing 15 is provided in the platform as shown most clearly on FIG. 2, and the motor shaft 20 extends up through this bearing. A pulley 18 is mounted on the shaft 20, and a C-clip 22 is force-fitted over a groove in shaft 20 for the purpose of maintaning pulley 18 in a position fixed between the C-clip and bearing 15.

A spring 24 is used for coupling shaft 20 to pulley 18. Both ends of the spring are bent as shown, with end 24*a* being inserted in a hole in shaft 20, and end 24*b* being inserted in a hole in the upper section 18*b* of pulley 18. A synchronous AC motor (which can be driven from an oscillator, not shown, so that it rotates at approximately 300 rpm) may not have a sufficiently high starting torque to set the various moving elements in motion if pulley 18 is secured directly to the motor shaft. It is for this reason that spring 24 is provided. When the motor first starts to operate, the turning of the shaft simply winds the spring up slightly. After the motor has turned a few degrees, the spring tension is sufficient to pull pulley 18 along with it so that the pulley rotates with the shaft. Although spring 24 is shown in the drawing as being wound in one direction, a spring wound in the other direction can also be used.

The lower section 18*a* of pulley 18 includes a groove which contains belt 26. The belt can be made of yielding rubber or any equivalent elastic material. Belt 26 is used to drive inertia element (flywheel) 38.

Figure 2:
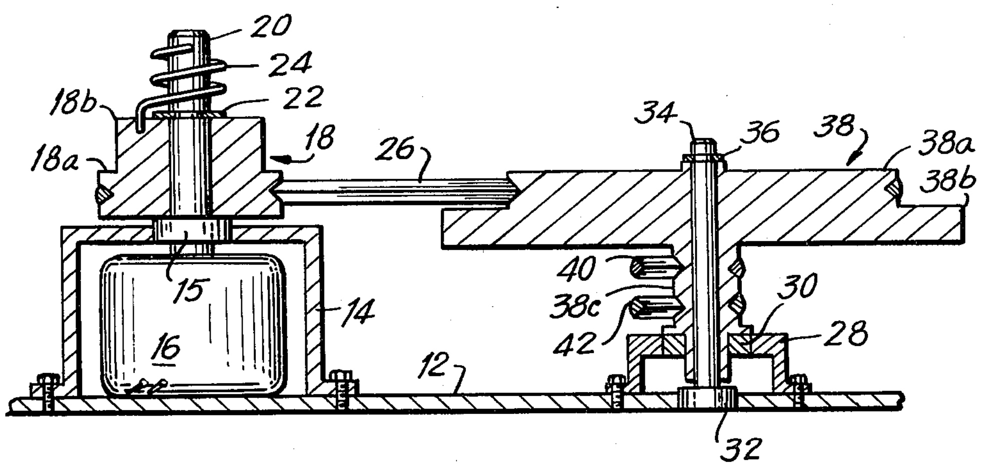
FIG. 2 is a sectional view taken through the line 2—2 of FIG. 1.

The mounting of the flywheel is shown most clearly in FIG. 2. A U-shaped bracket 28 is secured to platform 12, and a bearing 32 is provided in the platform for supporting the lower end of free-turning shaft 34 and maintaining it in a fixed axial position. Another bearing 30 is mounted in platform 28 for supporting flywheel 38, the flywheel being held in place by a C-clip 36 mounted at the top of the shaft. The flywheel itself consists of 3 parts: an upper section 38*a* having a groove for containing belt 26; an intermediate section 38*b* of increased radius for increasing the inertia of the flywheel; and a lower section 38*c* which is supported by bearing 30. This lower section has two grooves for containing two additional belts 40 and 42, these belts being used for the driving of the capstan and the take-up spindle. Preferably, the flywheel is made of metal; the heavier the flywheel (within the limits imposed by the motor torque), the better the regulation.

Figure 3:
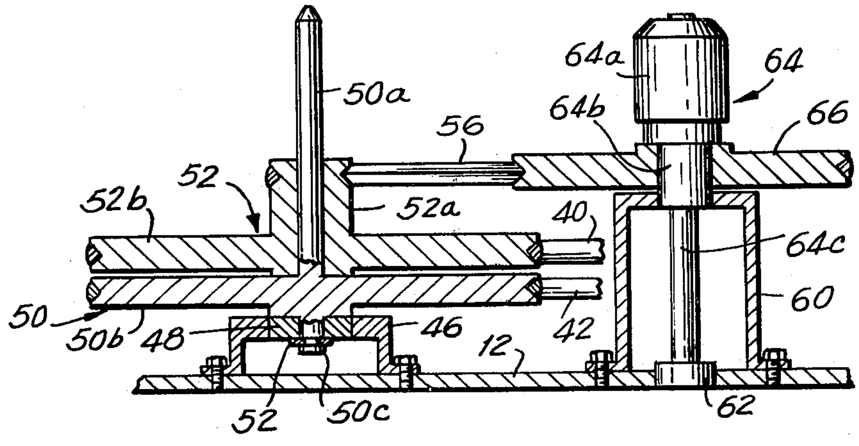
FIG. 3 is a sectional view taken through the line 3—3 of FIG. 1.

Element 50 (FIGS. 1 and 3) consists of an integral pulley 50*b* and a central capstan-shaped pin 50*a*. It is the capstan which actually drives a tape as is known in the art when the tape is made to bear against it by a pinch roller. A trunion 50*c* is provided on element 50 for support in bearing 48, this bearing being mounted at the center of platform 46. A C-clip 52 is mounted on a groove in trunion 50*c* for securing element 50 in place on top of bearing 48. Belt 42 couples element 50 to flywheel 38 for driving capstan 50*a*.

Pulley 52 consists of two axial sections 52*a* and 52*b*, and the pulley is mounted for free rotation about capstan 50*a*, the bottom of pulley 52 bearing directly against the top of section 50*b* of element 50 as shown. Each of the two sections of pulley 52 has a groove which contains a respective one of the belts 40 and 56. Belt 40 couples pulley 52 to the flywheel, and belt 56 couples the pulley to still another pulley 66.

This latter pulley is secured to axial element 64 which includes a spindle 64*a* for driving a standard tape cassette, an intermediate section 64*b* secured to pulley 66, and a shaft 64*c*. The shaft is mounted in bearing 62 secured in platform 12, and bracket 60 serves to support intermediate section 64*b* of element 64. Spindle 64*a* is driven at a speed which is greater than the maximum speed required for rotating the take-up reel of a standard tape cassette as is known in the art. When a tape cassette is placed over capstan 50*a* and take-up spindle 64*a*, the rotational speed of the take-up spindle is limited by the tape within the cassette whose speed is controlled by capstan 50*a*. Accordingly, when a cassette is placed on the drive mechanism, the take-up spindle does not move at maximum speed, and instead belt 56 slips relative to the groove in section 52*a* of pulley 52.

The speed reduction from pulley 18 to the flywheel is a little bit greater than 2:1. The speed reduction from the flywheel to each of pulleys 50 and 52 is approximately 7:1. The flywheel resists changes in its speed and causes belt 26 to alternately stretch and contract, thus filtering any speed changes which would otherwise be introduced from the cogging of the motor. The second reduction provided by belt 42 from the flywheel to the capstan pulley 50*b* provides the slow transient-free drive for the capstan. Even though the capstan moves at a relatively slow speed (which would prevent a flywheel secured to the capstan from being effective), the necessary flywheel action is achieved by placing the flywheel at an intermediate position between the motor and the capstan pulley. The ratio at the operating speed of the drive mechanism of the inertia of the flywheel to the inertia of the capstan element should be at least as high as 25:1, where the surface speed (tape speed) of the capstan is less than one inch per second. Adequate speed regulation is achieved (even for the recording of ECG signals at a tape speed as low as 1/16 inch per second) despite the fact that a relatively slow-speed motor is used. Although a high-speed motor inherently provides a flywheel effect by virtue of the mass of the rotor which is mounted on the high-speed shaft, the speed reduction which would be required with the use of such a motor would in itself introduce speed variations which may not be tolerable. Preferably, the speed of the motor used in accordance with the principles of my invention should be less than 400 rpm.

It is possible to omit pulley 52 and belt 40, and instead to use pulley 50 to drive the take-up spindle via belt 56. One of the advantages, however, of providing the extra pulley (52) and belt (40) is that speed variations introduced by the take-up spindle are isolated from the capstan. These variations are transmitted via belt 56, pulley 52 and belt 40 to the flywheel which effectively absorbs them. If a direct connection is made via a belt between the capstan pulley and the take-up pulley, then variations introduced by the take-up spindle may be reflected in the capstan speed.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A slow-speed tape recorder drive mechanism comprising a synchronous AC motor, a flywheel, first belt means for driving said flywheel from said motor, a capstan pulley having a capstan extending in the axial direction therefrom, second belt means for driving said capstan pulley from said flywheel, a take-up pulley having a take-up spindle extending in the axial direction therefrom, and means including at least one additional belt means for driving said take-up pulley from said flywheel, said first and second belt means being operative to control the surface speed of said capstan to be less than one inch per second and the inertia of the flywheel to be at least 25 times as great as the inertia of said capstan pulley and capstan at the operating speed of the drive mechanism.

2. A slow-speed tape recorder drive mechanism in accordance with claim 1 wherein said means for driving said take-up pulley includes an intermediate pulley coupled by a first additional belt means to said flywheel and coupled by a second additional belt means to said take-up pulley.

3. A slow-speed tape recorder drive mechanism in accordance with claim 2 wherein said intermediate pulley is mounted for free rotation axially in line with and around said capstan on top of said capstan pulley.

4. A slow-speed tape recorder drive mechanism in accordance with claim 3 wherein said motor includes a shaft and said first belt means includes a pulley mounted on said motor shaft, a spring for coupling said motor shaft to the pulley mounted thereon, and a belt for driving said flywheel by said motor pulley, said spring serving to allow the motor shaft to start turning slightly before said motor pulley is driven by said motor shaft and said spring.

5. A slow-speed tape recorder drive mechanism in accordance with claim 4 wherein the speed of said motor is less than 400 rpm.

6. A slow-speed tape recorder drive mechanism in accordance with claim 1 wherein the speed of said motor is less than 400 rpm.

7. A slow-speed tape recorder drive mechanism in accordance with claim 1 wherein said motor includes a shaft and said first belt means includes a pulley mounted on said motor shaft, a spring for coupling said motor shaft to the pulley mounted thereon, and a belt for driving said flywheel by said motor pulley, said spring serving to allow the motor shaft to start turning slightly before said motor pulley is driven by said motor shaft and said spring.

8. A slow-speed tape recorder drive mechanism in accordance with claim 7 wherein the speed of said motor is less than 400 rpm.

* * * * *